(12) United States Patent
Depeige

(10) Patent No.: US 8,511,610 B2
(45) Date of Patent: Aug. 20, 2013

(54) DEVICE FOR CLOSING AN AIRCRAFT DOOR, AIRCRAFT COMPRISING SUCH A DEVICE

(75) Inventor: Alain Depeige, Tournefeuille (FR)

(73) Assignee: Airbus Operations S.A.S., Toulouse (FR)

(*) Notice: Subject to any disclaimer, the term of this patent is extended or adjusted under 35 U.S.C. 154(b) by 402 days.

(21) Appl. No.: 12/989,205

(22) PCT Filed: Mar. 27, 2009

(86) PCT No.: PCT/FR2009/000349
§ 371 (c)(1),
(2), (4) Date: Oct. 22, 2010

(87) PCT Pub. No.: WO2009/133263
PCT Pub. Date: Nov. 5, 2009

(65) Prior Publication Data
US 2011/0042517 A1 Feb. 24, 2011

(30) Foreign Application Priority Data
Apr. 22, 2008 (FR) .................................. 08 52711

(51) Int. Cl.
*B64C 1/14* (2006.01)
(52) U.S. Cl.
USPC .................................. 244/129.5; 244/129.4
(58) Field of Classification Search
USPC .......................................... 244/129.4, 129.5
See application file for complete search history.

(56) References Cited

U.S. PATENT DOCUMENTS

| 2,885,039 | A | * | 5/1959 | MacFarland, Jr. | .......... 52/127.11 |
| 3,004,303 | A | * | 10/1961 | Wilmer | ............................ 49/249 |
| 3,791,073 | A | * | 2/1974 | Baker | ............................. 49/249 |
| 4,199,120 | A | * | 4/1980 | Bergman et al. | ........... 244/129.5 |
| 4,720,065 | A | * | 1/1988 | Hamatani | ................... 244/129.5 |
| 5,667,169 | A | * | 9/1997 | Erben et al. | ................. 244/129.5 |
| 6,059,230 | A | * | 5/2000 | Leggett et al. | .............. 244/129.5 |
| 6,378,806 | B1 | * | 4/2002 | Erben | ......................... 244/129.5 |
| 6,834,834 | B2 | * | 12/2004 | Dazet et al. | ................. 244/129.5 |
| 2007/0007390 | A1 | * | 1/2007 | Doerer | ........................ 244/129.5 |
| 2009/0045288 | A1 | * | 2/2009 | Nakamura et al. | .......... 244/129.5 |
| 2010/0294888 | A1 | * | 11/2010 | Texcier et al. | .............. 244/129.5 |
| 2011/0042517 | A1 | * | 2/2011 | Depeige | ..................... 244/129.5 |

FOREIGN PATENT DOCUMENTS
DE 1 105 725 4/1961

OTHER PUBLICATIONS
International Search Report issued Oct. 7, 2009 in PCT/FR09/00349 filed Mar. 27, 2009.

* cited by examiner

*Primary Examiner* — Tien Dinh
*Assistant Examiner* — Justin Benedik
(74) *Attorney, Agent, or Firm* — Oblon, Spivak, McClelland, Maier & Neustadt, L.L.P.

(57) ABSTRACT

An aircraft door closing device, and an aircraft incorporating such a device. The door includes a leaf and, connected to the aircraft fuselage, a frame including an opening configured to take the leaf, the leaf adopting a closed position to block the opening and another position to reveal the opening. The device includes a bearing mechanism, some on the leaf and some on the frame, each formed by a crenelated structure, two crenelated structures being arranged such that the teeth of one pass through notches of the other as the leaf moves from one position to the other, and such that the teeth of the leaf structure bear, in the closed position, on the inside face of the corresponding teeth of the frame structure.

19 Claims, 6 Drawing Sheets

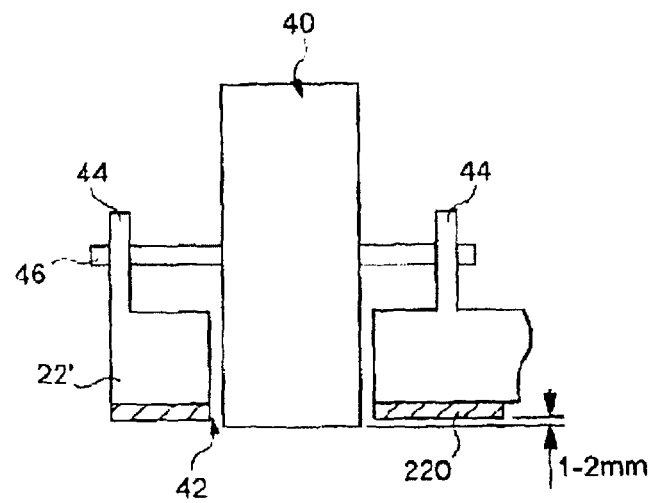
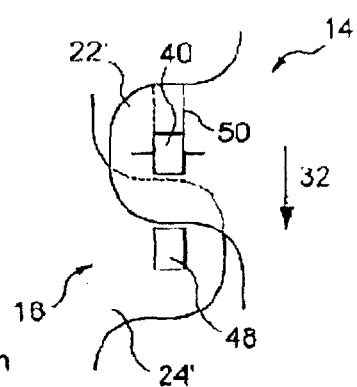
Fig. 9    Fig. 10
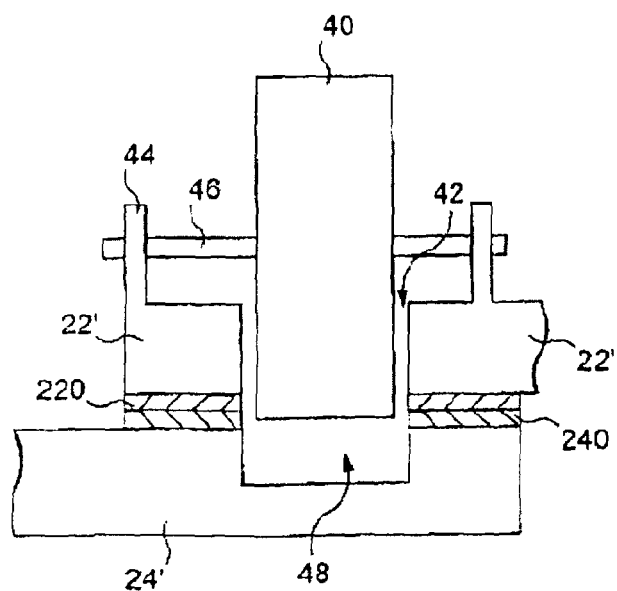
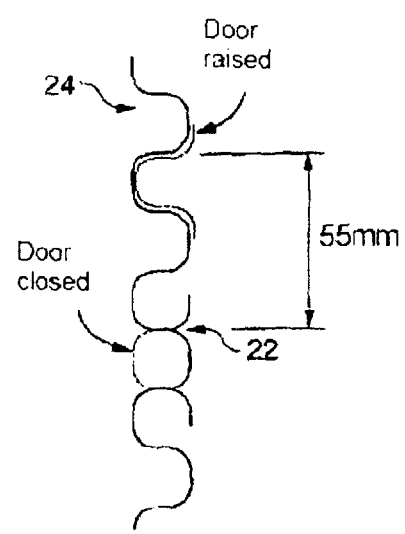
Fig. 11    Fig. 12

DEVICE FOR CLOSING AN AIRCRAFT DOOR, AIRCRAFT COMPRISING SUCH A DEVICE

This invention relates to a device for closing an aircraft door, as well as to an aircraft integrating such a device.

For the remainder of the description, by door there are understood all the devices such as leaf, hatch or the like, comprising a panel able to close up an opening in a wall in a first position and to clear it in another position irrespective of the forms, dimensions and function. An aircraft door therefore comprises, on the one hand, a frame connected to the fuselage of the aircraft, delimiting an opening, and, on the other hand, a leaf articulated in relation to the frame, able to occupy a first position referred to as closed in which it closes up the opening and another position in which it clears the opening by a displacement toward the outside of the aircraft. Different means may be provided to allow the articulation of the leaf in relation to the frame, in particular those described in the document FR-2 819 782. These articulation means are such that they allow the exterior surface of the leaf of the aircraft to show on the exterior shell of the fuselage in order to limit disturbances of the air flows around the said fuselage when the frame is in closed position.

The aircraft door additionally comprises closing means to hold the frame in closed position.

This invention relates more precisely to the family of aircraft doors referred to as "plug doors." These doors provide closing means such that in closed position, the leaf of the door bears, by means of stops and under the force exerted by the interior pressure of the cabin, on the corresponding stops provided on the frame. These stop elements generally are fixed. In this way the vibrations sustained by the moving elements provided in other systems, in reaction to the substantial pressure forces during flights, are avoided.

Such a door is, for example, illustrated by the document FR-2 889 228. On FIG. 3 of this document, the door has four stops provided on the leaf at the four corners thereof and four other corresponding stops provided on the frame. During locking and closing operations, an operator implements a slight vertical displacement of the leaf so as to cause the stops of the latter to slide behind the corresponding stops of the frame, that is to say on the interior side of the aircraft. In this way, by virtue of the inner pressure of the cabin, the stops of the frame come to bear on the interior face of the corresponding stops. The unlocking and opening operations are symmetrical in order to dislodge the stops of the leaf from the stops of the frame, so as to allow opening of the leaf toward the exterior of the aircraft.

A drawback of current aircraft doors lies in the fact that these stops are distributed discretely on the lateral edges of the opening. Thus, when a stop breaks, for example the bottom stop to the right of the door in the document FR-2 889 228, the leaf of the door no longer is wedged and is pushed by the interior pressure of the cabin. The result is a loss of sealing of the aircraft, altering the interior pressure, as well as risks of damage to the leaf through the vibrations and forces sustained in the fuselage.

One then is led to reinforce such stops, which disadvantageously increases the weight of the aircraft at a specific point of the fuselage.

Also, it has been possible to provide devices for closing an aircraft door providing an increased security in case of breaking of a stop as well as stops made lighter per unit.

To this end, the document DE 11 05 725 describes a device for closing an aircraft door comprising a leaf and a frame connected to the fuselage of the aircraft and having an opening able to receive the said leaf, the said leaf being able to assume a first position referred to as closed in which it closes up the said opening and a second position in which it clears the opening (generally in this position the leaf is outside the aircraft), the device comprising:

bearing means provided on the said leaf and corresponding bearing means provided on the said frame, the said bearing means each comprising respectively a crenelated structure made up of teeth and notches, and the said two crenelated structures being arranged so that the teeth of the one (crenelated structure) pass through the notches of the other (crenelated structure) during displacement of the leaf from one of the said positions to the other, and so that the teeth of the leaf structure come to bear, in the closed position, on the interior face of the corresponding teeth of the frame structure.

The solid parts of the crenelated structure here are called "teeth," while the notches constitute the uniform spaces left between these teeth.

The increase in the number of teeth, however, requires a heightened precision in the relative guidance between the leaf and the frame. A play in the existing guidance systems may bring about a relative dislodging of the teeth and a faulty closing.

In this context, this invention provides that the device comprises guidance means borne by a tooth of the said structures and arranged to guide the said bearing means of the said leaf on the interior side of the said corresponding bearing means in the closing movement of the said door.

In this way an imperfect positioning of the leaf in relation to the frame is tolerated, because the guidance ensures that the respective bearing means are staggered during the closing movement causing the bearing means of the leaf to pass behind those of the frame, and vice versa during the opening movement. By having the guidance means borne by one or more teeth of a structure, it is ensured that the corresponding teeth in fact "pass" on the other side of the said structure, without these corresponding teeth banging into each other, preventing the closing of the door.

In order to optimize the distribution of bearing forces compared with the extent of the crenelated structures, it is provided that the said corresponding crenelated structures have more or less the same teeth sizes. The result actually is a bearing on the entire surface of the teeth in closed position.

This arrangement makes it possible to provide a great number of stops, simple to manufacture, over a planned available length while preserving the kinematics of the "plug" doors.

By optimization of the number of stops distributed over the length of the sides of the leaf, forces thus are better distributed and the individual structures of the stops thereby are made lighter, particularly in their thickness.

In particular, the said teeth and notches of the structures are more or less the same size, the said notches being provided to allow the said corresponding teeth to pass during the said displacement. For example, the notches have a size equal to 100 to 125% of the size of the teeth in the general direction of the crenelated structures.

The separation of the stops by a distance more or less equal to, in particular slightly greater than, the size of these stops ensures the passage of the stops "behind" the corresponding stops of the frame to implement the vertical displacement in the closing movement of the door. In this way, the "plug" kinematics in fact is retained.

In practice, the crenelated structures are provided on at least one surface, generally lateral, of the said frame and leaf.

Thus, in one embodiment it is provided that the leaf and the frame each comprise two crenelated structures on two opposite surfaces, in particular on the lateral surfaces (exterior for the leaf and interior for the frame) as opposed to the upper and lower surfaces thereof.

According to a particularly advantageous embodiment, the said bearing means of the leaf on the one hand and the said corresponding bearing means of the said frame on the other hand each are made up of a single crenelated part cast in one piece. The production costs and the solidity of the whole then are guaranteed.

In one embodiment, the guidance means comprise at least one tooth of the said leaf structure. This tooth then has a dual function (as stop and as guidance slide), consequently reducing the number of elements used for the structure of the closing device.

In particular, the said guidance means comprise a roller installed moving in rotation, running through one of the said teeth of the leaf at an opening made in the said tooth of the leaf so as to roll at least in part on a corresponding tooth of the said frame. In this particular configuration, the bearing means or corresponding teeth of the frame also have a dual function (support and guidance). It then is provided that the said corresponding tooth of the said frame comprises to the right of the said opening made, in the said closed door position, a recess able to receive the part of the roller protruding from the said tooth at the said opening made. It may involve, in particular, a blind hole or a through-hole. The latter enables the roller to no longer slide or roll on the tooth acting as bearing means. In this way, in closed door position, the teeth are in frictional contact, ensuring an effective bearing.

It is noted that the teeth of the leaf and frame have symmetrical functions. Thus, the position of the roller in particular may be reversed and the latter may be borne by a tooth of the frame.

In particular, the said corresponding teeth each comprise a friction pad able to cooperate to reinforce the said effective support.

Furthermore, the said reinforcement is implemented only in the thickness of the friction pad. In this way the machining of the teeth, which must be solid in order to withstand the pressure differences between the inside and outside of the airplane, is minimized.

In one embodiment, the said leaf comprises additional bearing means arranged to come to bear on the exterior face of corresponding bearing elements provided on the said frame, in particular on the exterior face of the bearing means or teeth of the frame. This configuration applies in particular at the time of a negative cabin differential pressure. In this way, irrespective of the pressure differential between the inside and the outside of the aircraft, the leaf of the door is held bearing on the frame, ensuring an effective closing of the door.

In particular, the said additional bearing means are made up of an outer skin panel of the said leaf. The skin thus plays a dual role: outer shell of the airplane as regards disturbances and closing means for the door.

According to one characteristic of the invention, the device comprises sealing means between the said leaf and the said frame, these sealing means defining a pressurized zone inside the said aircraft and a non-pressurized zone, the said teeth being provided in the said non-pressurized zone. It thus is provided that the bearing is implemented as close as possible to the skin of the leaf. The recess between the door and the fuselage then is reduced, as is the noise pollution (or aerodynamic noise) in the cabin due to this recess.

In one embodiment, the said size of the said teeth is more or less equal to the vertical travel of the said leaf in its opening and closing movement. In this way, a tooth of the leaf engages between two teeth of the frame in the closing movement, then the vertical travel makes it possible to bring the teeth of the leaf to the right of the corresponding teeth of the frame so that the bearing is implemented over the entire surface thereof.

In particular, in order to reuse the mechanisms already developed at the present time, which allow a vertical travel of 55 mm, it is provided that the said size of the teeth in the said length (that is to say according to the general direction of the crenelated structure) ranges between 48 and 54 mm, for example 50 mm, and the said size of the notches ranges between 56 and 62 mm, for example 60 mm. Similar ratios may be applied for any other vertical-travel value.

A tolerance in the construction and alignment of the respective bearing means is obtained when the said size of the notches ranges between 100 and 125% of the said size of the teeth, in particular 120%.

Several embodiments of the bearing means for the frame may be provided.

In particular, it is provided that the said teeth of the frame are formed by the ends of the skin of the fuselage at the said door opening. By using a single panel acting as skin of the fuselage and as bearing means for the frame, the process of installing the door is simplified.

As a variant, the said teeth of the frame are formed by a stiffening panel added to the inner face of the skin of the fuselage. This configuration thus offers a sturdier door because the stresses and forces applied directly to the skin are minimized.

Still as a variant, the said teeth of the frame are added, with the aid of removable fastening means, to a framework of the said fuselage provided at the said door opening. Thus, in the event of breaking of a bearing means, it is easy to change it. Moreover, this configuration allows a greater tolerance to impacts, for example from passengers and their suitcases boarding through the door, in comparison with implementations in which impacts are applied directly on the skin. In fact, here the frameworks of the fuselage are far more resistant than the skin of the fuselage.

Similarly, several embodiments of the bearing means for the leaf may be provided.

According to one configuration, it is provided that the said leaf comprises a door structure having a skin forming the exterior surface and having at least one lateral door leaf panel, the said teeth of the leaf being formed by ends of the said lateral leaf panel. In this way a panel cast in one piece allowing a rapid installation is achieved.

As a variant, the said leaf comprises a door structure having a skin forming the exterior surface and having at least one lateral door leaf panel, the said teeth of the leaf being formed by at least one piece added onto the said lateral leaf panel, which easily allows repairs by replacement of at least one part of the bearing means for the leaf.

In particular, a part of the space formed between the said teeth of the leaf and the said skin is filled in with the aid of a filling material. In this way the recess likely to generate noise pollution for the cabin is reduced.

The invention also applies to an aircraft comprising at least one door provided with a closing device such as presented above.

Optionally, the aircraft may comprise means relating to the device characteristics presented above.

Other features and advantages of the invention also will become apparent in the description below, illustrated with the attached drawings, in which:

FIGS. 8 to 11 illustrate guidance means that may be used in any one of the implementations of FIGS. 4 to 7; and FIG. 12 illustrates an open and closed position of an implementation of the closing device.

Figure 1:
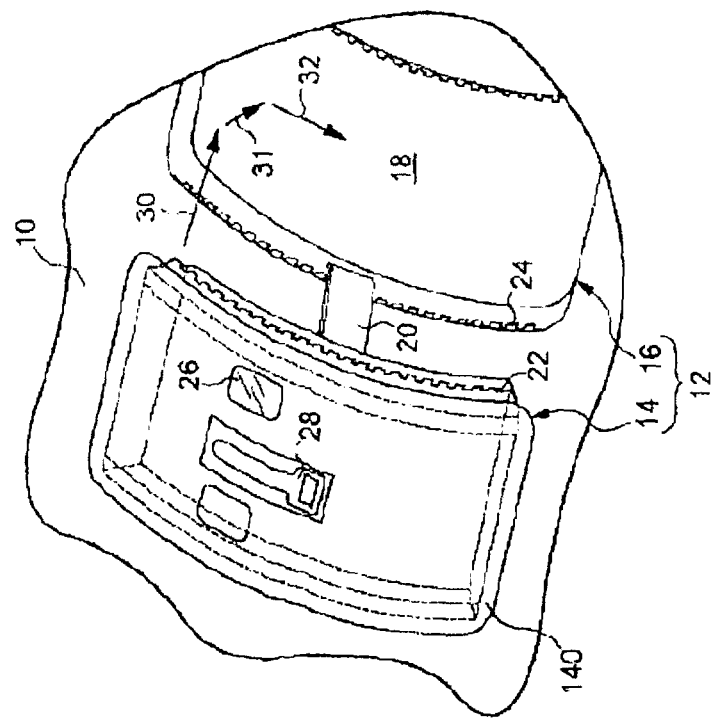
FIG. 1 shows a general view of an aircraft door comprising a closing device according to this invention.

There has been shown on FIG. 1 an aircraft fuselage 10 comprising a door 12 in "open" position, provided in particular for entry and exit of persons inside the aircraft.

As indicted above, door 12 comprises a leaf 14 and a frame 16 connected to the said fuselage 10 and forming an opening 18, leaf 14 being articulated in relation to frame 16 so as to close up opening 18 or to clear it.

Door leaf 14 is made up of a monocoque structure made out of composite material forming a single monolithic piece, the structure comprising at least one outer skin 140 and an inner mono-directional or multi-directional stiffener (not shown), if need be a second inner skin, the whole constituting a box-type structure enclosing or not enclosing thermal insulation and soundproofing materials. Such a structure is achieved by techniques of injection or diffusion of resin into pre-forms made out of woven fibers placed in complex molds, comprising one or more extractible or soluble cores, so as to produce double-walled box-like structures, for example.

As a variant, the structure may be of sandwich type comprising two skins on a honeycomb or foam core.

Articulation mechanisms 20 for locking and unlocking are provided on door 12 to allow its use in the two positions referred to as open and closed.

Crenelated structures 22, 24 here are illustrated as only a part of the locking and unlocking mechanisms. In standard manner, these mechanisms furthermore may comprise shafts cams, levers, bell crank levers and other rod connections. As will be seen subsequently, crenelated structures 22, 24 contribute to holding door 12 in closed position. Locking of the door therefore is accomplished by additional means.

Door 12 is equipped with other elements, such as a window 26, a control handle 28 for the locking and unlocking means, as well as a fitted-out escape slide or escape slide-life raft and mechanisms for setting up the escape slide and for mechanized emergency opening generally provided in the lower part of leaf 14.

This example is concerned particularly with crenelated structures 22, 24 of door 12 represented, by way of example, on FIG. 1 by a crenelated structure disposed over the entire length of the lateral surfaces of door 12. Corresponding crenelated structures 22, 24 thus are provided respectively on leaf 14 and on frame 16.

Door 12 here is of "plug" type, that is to say that in "closed" position, leaf 14 is held closed against frame 16 connected to the fuselage by virtue of the interior pressure of the aircraft cabin.

In the closing kinematics of door 12, leaf 14 is brought opposite opening 18 according to a movement in the horizontal plane (the longitudinal direction of the aircraft), illustrated by arrow 30. In this movement, crenelated parts 22, 24 of leaf 14 and frame 16 are offset in staggered manner. A movement according to arrow 31 (perpendicular to the plane of the leaf and the fuselage at this point) brings the leaf toward the inside of the aircraft, and at the end of travel according to arrow 31, teeth 22 of leaf 14 "pass through" crenelated part 24 of frame 16 to become positioned on the interior side of the cabin in comparison with those of the frame. As a variant, the movements according to arrows 30 and 31 may be combined by virtue of appropriate kinematics of articulation means 20.

A second closing phase of door 12 is accomplished by the vertical displacement of leaf 14 (in the plane thereof according to the general direction of the crenelated structures) according to arrow 32, typically on the order of 55 mm, by reciprocal sliding bringing teeth 22 of leaf 14 to the right of corresponding teeth 24 of frame 16. Thus, in "closed" door 12 position, crenelated part 22 of leaf 14 comes to bear on the interior face of crenelated part 24 of frame 16 as a result of the inner pressure of the cabin of the aircraft.

The operation of opening door 12 is accomplished symmetrically with a first phase intended to release teeth 22 from teeth 24.

Unlike the known solutions of the state of the art proposing discrete stops, this crenelated configuration 22 proposes a profile of stops made up of "semi-continuous" teeth, interruptions (spaces between teeth) being necessary only for passage of the corresponding teeth in the closing/opening kinematics of the door. Aside from these necessary interruptions, the resulting bearing surface (the sum of the individual surfaces of the teeth) then is maximal.

Figure 2:
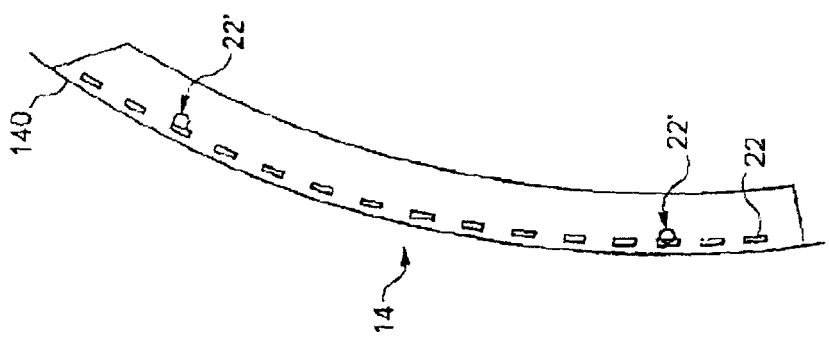
FIG. 2 shows a lateral view of the door leaf of FIG. 1.

On FIG. 2, a side view of leaf 14 has been shown, revealing the "semi-continuous" profile of stops-teeth 22. This takes on the curvature of outer skin 140 of leaf 14.

Two stops 22', one more or less at the high end of the profile and the other more or less at the low end of the profile, provided on each side of leaf 14, are equipped with guidance means, here a roller as illustrated below in connection with FIGS. 8 to 11.

Figure 3:
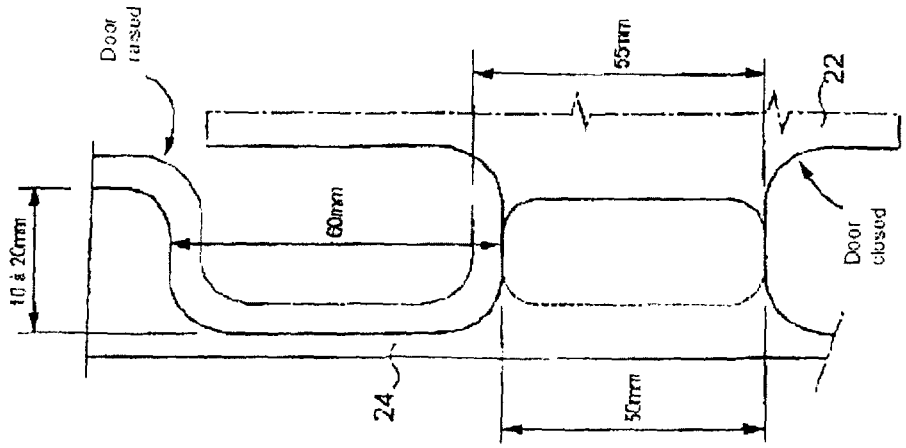
FIG. 3 shows a detail of the closing device of FIG. 1.

On FIG. 3, a detail of crenelated parts 22 and 24 has been shown. The depiction of the leaf in an unbroken line corresponds to the "closed" position and the one in a broken line corresponds to the door displaced according to vertical travel 32 of 55 mm so that crenelated parts 22 and 24 are staggered.

Crenelated stops 22 and 24 here are in a single piece at the height of door 12.

Each tooth 22, 24 is more or less rectangular with largest dimension 50 mm in the length of the crenelated structure; the space between teeth, for its part, being about 60 mm. In this way, when the teeth are staggered because of vertical travel 32, the result is a tolerance of 5 mm on both sides of the teeth to allow opening of the leaf by displacement according to arrow 30 despite a relative positioning of structures 22 and 24 that is not fully staggered.

By way of example, a width of 10 to 20 mm for overlapping of the teeth may be provided.

Several implementations of teeth means 22 and 24 now will be described in connection with FIGS. 4 to 7.

Irrespective of the implementation concerned, sealing means between leaf 14 and frame 16 are provided, these sealing means defining a pressurized zone inside the said aircraft, generally the cabin, and a non-pressurized zone.

These implementations have, in particular, configurations in which stops 22 and 24 are provided in the non-pressurized zone and a configuration in which these stops are in the pressurized zone. In general, the implementations in which these crenelated stops are outside the pressurized zone result from the at least partial use of the covering of the fuselage as bearing element. It thus is necessary to move the sealing joint, having a certain size in order to be effective, toward the inside of the aircraft in relation to the stops. The contribution of the covering of the fuselage as a bearing element results in a reduction of the number of pieces and/or fastenings to be added in order to impart the desired functions.

In general, the implementations with crenelated stops in the pressurized zone use crenelated stops added onto the edge of the frame and the leaf. The space between the fuselage covering and the stops facilitates integration of the sealing joint into this zone. The result is a decrease in aerodynamic noise through reduction of the recess forming this zone. The result also is a reduction of the risks of icing of the stop and bearing elements in contact.

Figure 4:
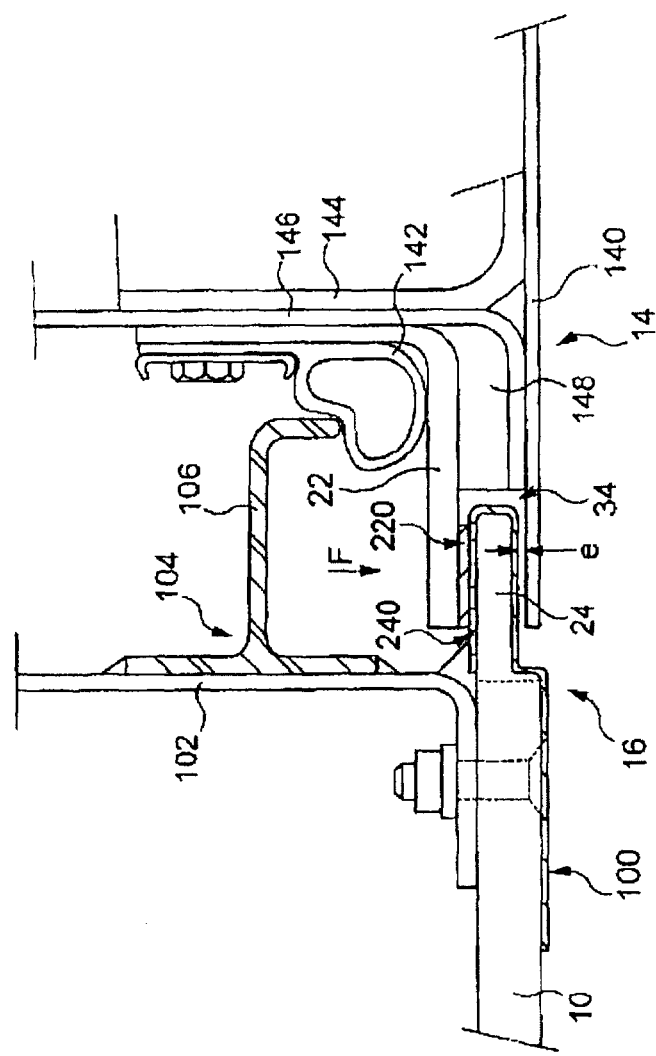
FIGS. 4 to 7 illustrate different implementations of the closing device according to the invention.

On FIG. 4, a detail of cooperation between the closing elements of the invention at the leaf 14/frame 16 interface has been shown in horizontal section. The section is shown at a couple of tooth stops 22 and 24 in the "closed" door position. In fact, the two tooth stops 22 and 24 bear on one another because of the force F exerted by the inner pressure of the cabin, in that way ensuring the holding of leaf 14 in closed position.

In this configuration, frame 16 is integral with a composite block panel of fuselage 10 forming the skin of the latter. Tooth stops 24 are implemented in the actual body of this panel at the end thereof, at opening 18. In detail, these stops 24 are of lesser thickness at the termination of the panel at opening 18 so that skin 140 of leaf 14 comes into the continuity of the exterior surface of fuselage panel 10.

There is described here as "interior" any surface or portion oriented toward the cabin of the aircraft and as "exterior" that which is oriented toward the outside of the aircraft.

A framing piece made of thin sheet metal 100 consisting of stainless steel or titanium-based alloy is added onto the end of panel 10 and onto stops 24 in order to protect the latter from possible impacts caused by the passengers entering or leaving the aircraft.

The interior face of stops 24 is provided with a friction pad 240, here made of bronze, extending over the entire surface of the stop.

Panel 10 is fastened to a composite framework 102 of the fuselage by drilling and riveting or bolting. Framework 102 forms an edge of the framing of the door, here the frame.

A sealing piece 104 made of metal, for example of aluminum, is added, for example by mechanical fastening (not shown, so as to easily undertake a possible replacement) over the entire height of framework 102 and has an arm 106 also extending over the entire height of piece 104 and acting as joint-bearing arranged to cooperate with corresponding sealing means 142 provided on door leaf 14, here a rubber bead deformable by arm 106. The interior lining of the cabin (covering 114 shown on FIG. 6) generally is fastened to the base of the free end of arm 106.

This sealing bead 142, here 25.4 mm in diameter, is fastened removable, for changing it easily, over the entire height of the sides of leaf 14.

The latter 14 is made up of a structure of crosspieces 144 supporting skin 140 on the exterior face of the aircraft and a lateral door element 146, also composite and added by bonding onto crosspieces 144 at the edge of the leaf. This lateral door element 146 generally supports an interior door covering.

The crenelated structure element 22 here is composite and also added onto lateral door element 146 (or edge element) between sealing bead 142 and skin 140 of leaf 14. The exterior face of each tooth stop 22 is provided, by bonding or other fastening, with a friction pad 220, here also made of bronze, which comes to slide on pad 240 of corresponding tooth 24 during the opening or closing movement of the door.

Teeth stops 22 constituted in this way are parallel to skin 140, the latter extending at the same height as the free end of stops 22. These elements thus delimit a space 34 for receiving stops 24 in "closed" door position, which space has a width more or less equal to the thickness of stops 24. In particular, it is provided that a residual space 'e' of at least 2 mm separates skin 140 from stop 24 inserted into space 34.

Thus during displacement according to arrow 30, leaf 14 engages until stops 24 are positioned at the height of space 34, then through displacement according to arrow 32, pads 220 and 240 slide on one another to position stops 22 and 24 to the right of one another.

It is noted that the extension of outer skin 140 at the height of the back of stops 24 allows a possible bearing of the exterior on tooth stops 24 of the fuselage in cases of negative differential pressure (outer pressure greater than the inner pressure prevailing in the cabin) or cases of water landing (outside hydraulic pressure).

By providing stop means 22 and 24 also close to the skin of leaf 14 and the fuselage, sealing joints 104, 106, 142 likewise are brought near the skin, which reduces the recess existing between the door and the fuselage and contributes to reducing noise pollution in the cabin.

In addition, space 34 formed between stops 22 and skin 140 of leaf 14 may be partially filled with an added composite material 148 so as to further reduce the volume of the recess and therefore the noise pollution. This additional material 148 also increases the inertia of the structure and therefore resistance to the forces sustained by the door.

Preferably, skin 140, edge element 146, filling 148 and crenelated structure 22 are made of integral cast carbon.

Here the overlapping of stops 22, 24 is 18 mm in width +/−2 mm.

Figure 5:
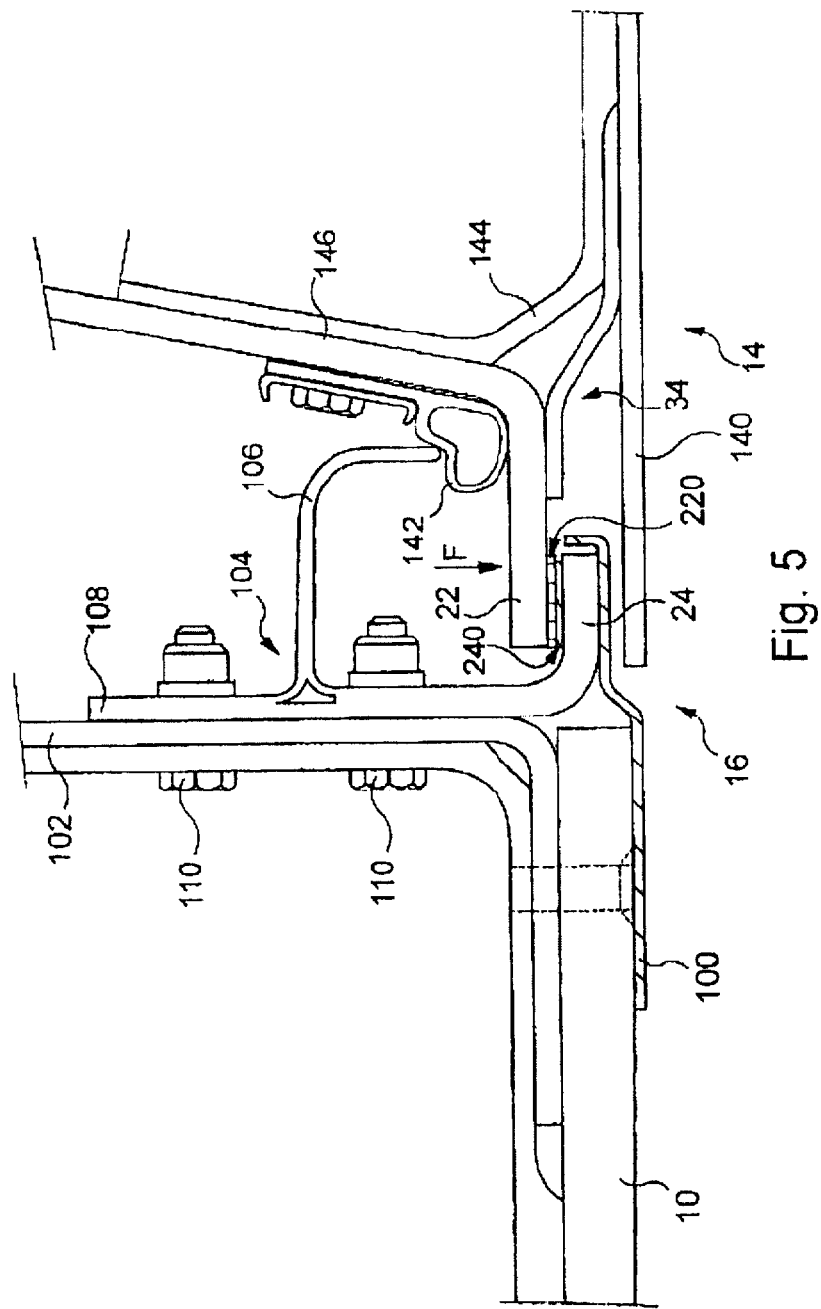

On FIG. 5, another implementation of the invention has been shown using references identical to FIG. 4 for the same elements.

The system according to this Figure comprises characteristics identical to that of FIG. 4.

Nonetheless, in this implementation, stops 24 of frame 16 no longer are borne by skin 10 of the fuselage.

It is provided here that stops 24 form an end of a metal part 108 added by removable fastening 110 onto the edge of the frame, here framework 102 of the fuselage. This configuration makes it possible, in particular, to easily undertake replacement of stops 24 in case of damage thereto. Moreover, this added piece 108 is more tolerant to impacts than skin 10 of the fuselage.

In addition, this same added piece 108 may incorporate, in the mass, sealing element 104 and arm 106 relating thereto. As a variant, this sealing element 104 may be fastened removably either to metal piece 108 or directly to framework 102.

As for stops 22, they are provided independently at the end of edge element 146, which avoids adding an additional element in the process of manufacturing the structure of the leaf.

Again independently of these elements, this configuration of FIG. 5 provides a more compact implementation of the closing means by "semi-continuous" stops.

To accomplish this, teeth stops 22 and 24 are of reduced width in order to ensure an overlapping in "closed" door position, reduced to 16 mm. In this way a sealing bead 142 with diameter reduced to 18 mm may be used.

The structure of leaf 14 then has a trapezoid shape, edge elements 146 narrowing toward the inside of the aircraft so that the fastening means for joints 142 do not come to touch and damage sealing arm 106.

Figure 6:
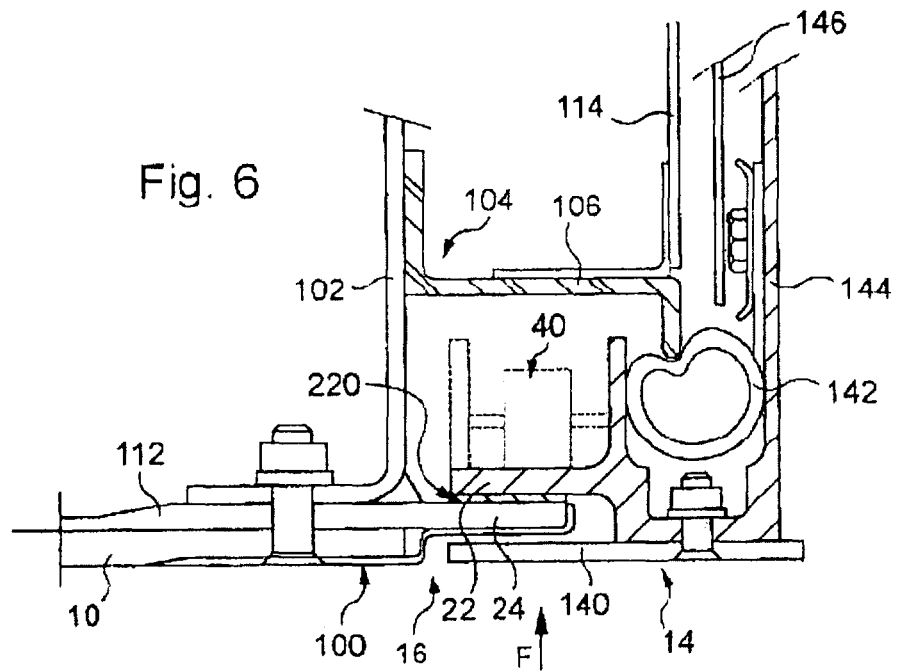
Figure 8:
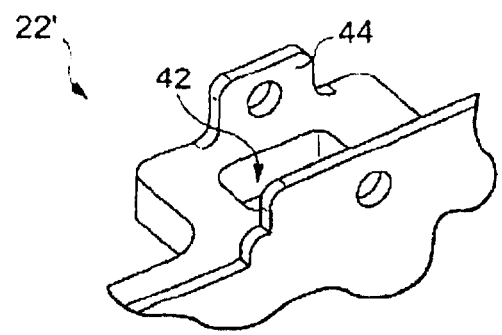

On FIG. 6, yet another embodiment of the invention, in which stops 22 and 24 are still in the non-pressurized zone, has been shown.

The system according to this Figure comprises characteristics identical to that of FIG. 4.

Nonetheless, the fuselage of the aircraft comprises a reinforcement piece 112 disposed on the perimeter of opening 18 and held between framework 102 and skin 10 by standard fastening means, here bolts. This structure is here, and not in limitative manner, metal.

The free end of reinforcement part 112 on the side of opening 18 is cut out so as to form crenelated structure 24. If necessary, each of stops 24 is lined with a bronze pad 240.

Leaf 14 of hybrid composition comprises a likewise metal structure 144 on which there rests, by bolt-type mechanical fastening, the panel of composite skin 140. This metal structure is, for example, made of aluminum machined in appropriate sections.

Stops 22 are provided in this metal structure, which ensures a substantial stiffness for leaf 14.

As shown in broken lines, certain stops 22' are provided with a roller 40 ensuring functions for guidance of leaf 14 on frame 16, as will be seen subsequently.

It is understood that structures 24 of frame 16 presented above may be combined with any one of structures 22 of leaf 14 above, independently of their explicit association in the examples described here.

Figure 7:
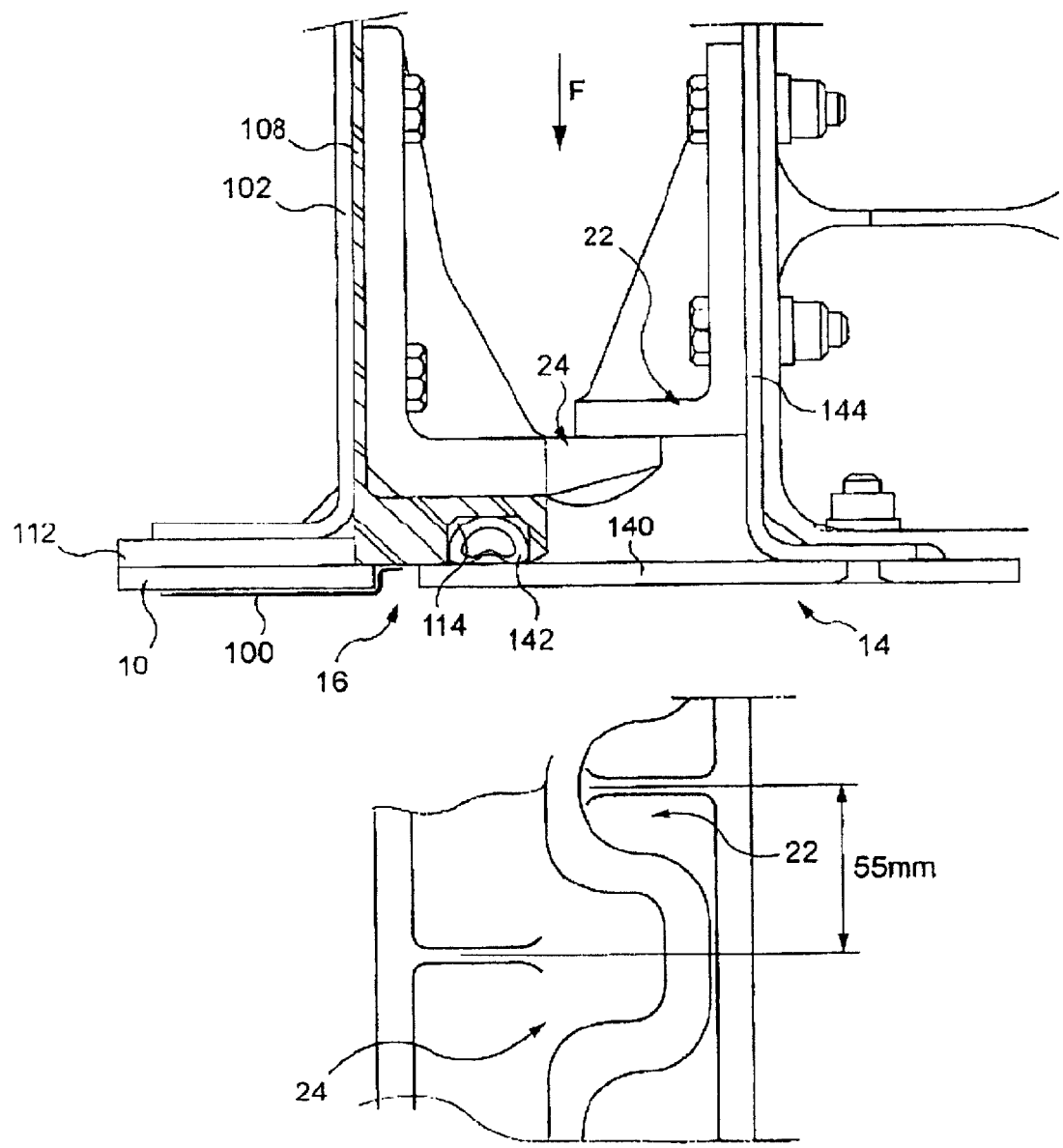

In FIG. 7, yet another embodiment of the invention has been shown, this time disposing stops 22 and 24 in the pressurized zone of the aircraft.

The system according to this Figure comprises characteristics identical to that of FIG. 4.

Nonetheless, the fuselage of the aircraft here is composite with a carbon skin 10 protected at its free end on opening 18 by a thin sheet-metal framing part 100, a reinforcement 112 and a fuselage framework 102 also made of carbon, as well as an "L"-shaped fiberglass piece 108, the foot turned toward the interior of the opening, and added onto framework 102.

The foot of this added piece 108 is provided, on its face toward the exterior of the aircraft, with a channel 114 able to accommodate a rubber sealing joint 142. In "closed" door position, the inner surface of the free end of skin 140 of leaf 14 comes to compress the said joint 142 so as to achieve the desired sealing.

In the innermost part of the cabin, there is added onto the edges of frame 16 and leaf 14 respectively, here onto framework 102 of frame 16 and onto a crosspiece 144 of leaf 14, a crenelated metal piece 22 and 24. These two crenelated pieces 22 and 24 cooperate to ensure the bearing function mentioned above.

On FIGS. 8 to 11, there has been shown an exemplary stop 22' provided for receiving a guidance roller 40, which may be applied in particular to all the above implementations of teeth stops.

Tooth 22' here is provided at its center with a through-opening 42 through which roller 40 passes. Roller 40 thus extends slightly (about 2 mm) beyond the outer surface of pad 220 provided underneath tooth 22'.

Fastening means 44 for the roller also are provided, in particular vertical plates equipped with holes for receiving a shaft 46 supporting the said roller 40 in rotation.

There is provided on frame 16 a rail 50 on which the said roller 40 slides or rolls in the end phase of closing (end of movement according to 30 and beginning of movement according to 32). During movement 32, this rail brings roller 40 to the height of tooth 24' corresponding to tooth 22 supporting the roller (FIG. 10).

The lowering travel 32 of leaf 14 is continued with roller 40 which rolls on friction pad 240 of corresponding stop 24'. Then since stop 24' is provided at its center (symmetrically to opening 42) with a recess 48, roller 40 "falls" into this recess at the end of travel 32 so that friction pads 220 and 240 bear on one another (FIG. 11).

The unlocking and opening movement of the door executes the reverse path for roller 40.

On FIG. 11, a blind hole 48 made in stop 24' has been shown.

As a variant, a through-hold may be provided. That makes it possible to use identical crenelated structures 22' and 24'.

In another variant, recess 48 may be made only in the thickness of pad 240. This configuration is possible if roller 40 extends beyond pad 220 only by a thickness less than that of pad 240.

A variant to the roller-type guidance means provided directly on stops 22 consists in providing standard guidance means, with slide and roller for example, disposed set back from stops 22 and 24 toward the inside of the cabin in order to guide the said bearing means of the said leaf on the interior side of the said corresponding bearing means in the closing movement of the said door.

The composite elements mentioned above may be of carbon type in a matrix (or resin reinforced with carbon fibers known as PRFC or according to English terminology, "Carbon Fiber Reinforced Plastic" CFRP), this matrix being thermosetting of epoxide type or thermoplastic of PEEK (polyether ether ketone), PEKK (polyether ketone ketone) or PPS (phenylene polysulfide) type, the level of fibers in aeronautical applications being greater than or equal to 50%.

In one embodiment, two or more rows of crenelated structures may be provided per door side, in order to further divide up the forces sustained by each stop 22/24 and therefore reduce the structural sizing thereof.

The foregoing examples are only embodiments of the invention, which is not limited thereto.

In particular, a fuselage 10 and a door structure 12 of standard type with a metal structure may be provided instead and in place of composite implementations.

Likewise, stops 22, 24 have been provided on the lateral surfaces of the door since the movement of the latter comprises a vertical displacement for its closing. Nonetheless, it may be provided that the closing of the door 12 comprises a final horizontal displacement and that stops 22 and 24 are provided on the upper and lower parts of door 12.

Furthermore, teeth-stop sized clearly less than the raising or lowering travel of leaf 14 may be provided, as illustrated on FIG. 12. In this case, during raising or lowering travel, a stop 22 comes to "fly over", possibly by sliding, several corresponding stops 24 before reaching the "closed" door position (in the closing direction) or before leaf 14 assumes a staggered position in relation to frame 16 in order to execute displacement according to the arrow referenced 30 above (in the opening direction). An identical contact and bearing surface nonetheless is retained.

Also, although the above description mentions crenelated structures cast in one piece extending over the entire height on the door side, it may be provided that several crenelated structures aligned on the "semi-continuous" profile are used. Individual teeth also may be added along the profile so as to form a crenelated assembly.

Also, a roller not installed movable may be used to achieve the guidance means, in which case it slides over the corresponding slides and surfaces. Moreover it may be provided that the roller is installed on a stop of frame 16 and no longer of leaf 14.

The invention claimed is:

1. A closing device for an aircraft door including a fuselage, a leaf, and a frame connected to the fuselage including an opening configured to receive the leaf, the leaf configured to assume a first closed position in which it closes up the opening and a second open position in which it clears the opening, the device comprising:
bearing means provided on the leaf, and
corresponding bearing means provided on the frame,
wherein the bearing means and the corresponding bearing means respectively include a crenelated structure including teeth and notches, and the teeth of the bearing means pass through the notches of the corresponding bearing means during displacement of the leaf from one of the positions to the other,
wherein teeth of the crenelated structure of the leaf abut, in the closed position, on an interior face of corresponding teeth of the crenelated structure of the frame; and
wherein a guidance roller affixed on a tooth of at least one of the crenelated structures is arranged for guiding the bearing means of the leaf on the interior face of the corresponding bearing means of the frame in a closing movement of the aircraft door.

2. A device according to claim 1, in which crenelated structures have more or less same teeth sizes, and teeth and notches of the crenelated structures are more or less of same size, the notches being provided for allowing the corresponding teeth to pass during the displacement.

3. A device according to claim 1, in which the bearing means of the leaf and the corresponding bearing means of the frame are each formed from a single crenelated part cast in one piece.

4. A device according to claim 3, in which the leaf comprises additional bearing means including an outer skin panel of the leaf and arranged to abut on the exterior face of the teeth of the crenelated structure of the frame.

5. A device according to claim 1, in which the guidance roller comprises a roller, installed movable in rotation, passing through one of the teeth of the crenelated structure of the leaf at an opening in the one of the teeth of the crenelated structure of the leaf so as to roll at least in part on a corresponding tooth of the crenelated structure of the frame.

6. A device according to claim 5, in which the corresponding tooth of the frame comprises to the right of the opening, in the closed door position, a recess configured to receive a part of the roller protruding from the one of the teeth of the crenelated structure of the leaf at the opening.

7. A device according to claim 6, in which the recess is a hole so that, when the recess receives the roller, the corresponding teeth are, in closed door position, in frictional contact.

8. A device according to claim 6, wherein the teeth of the crenelated structures comprise a friction pad as a reinforcement.

9. A device according to claim 8, wherein the reinforcement is implemented only in a thickness direction of the friction pad.

10. A device according to claim 1, in which the leaf comprises additional bearing means formed by an outer skin panel of the leaf and arranged to abut on an exterior face of the teeth of the crenelated structure of the frame.

11. A device according to claim 1, further comprising sealing means between the leaf and the frame, the sealing means defining a pressurized zone inside the aircraft and a non-pressurized zone, the teeth of the crenelated structures being provided in the non-pressurized zone.

12. A device according to claim 1, in which a size of the teeth of the crenelated structures is more or less equal to a vertical travel of the leaf in an opening or closing movement.

13. An aircraft comprising at least one door including a closing device according to claim 1.

14. A device according to claim 1, wherein a tolerance in construction and alignment of the bearing means is obtained when a size of the notches of the crenelated structures ranges from 100% to 125% of a size of the teeth of the crenelated structures.

15. A device according to claim 1, wherein the teeth of the crenelated structure of the frame are formed by ends of the fuselage skin at the door opening.

16. A device according to claim 1, wherein the teeth of the crenelated structure of the frame are formed by a stiffening panel added to an inner face of the fuselage skin.

17. A device according to claim 1, wherein the leaf includes a skin forming an exterior surface and including at least one lateral door leaf panel, teeth of the crenelated structure of the leaf being formed by ends of the at least one lateral door leaf panel.

18. A device according to claim 1, wherein the leaf includes a skin forming an exterior surface and including at least one lateral door leaf panel, with teeth of the crenelated structure of the leaf being formed by at least one piece added onto the at least one lateral door leaf panel.

19. A device according to claim 1, wherein at least part of a space formed between the teeth of the crenelated structure of the leaf and a fuselage skin is filled with a filling material.

* * * * *